United States Patent [19]
Gore et al.

[11] Patent Number: 5,948,266
[45] Date of Patent: Sep. 7, 1999

[54] HAND MANIPULABLE SKIMMER SYSTEM FOR REMOVING AN OIL SHEEN FROM THE SURFACE OF A BODY OF WATER

[75] Inventors: Douglas J. Gore, Concord; James Ramsey, Vacaville, both of Calif.; Michael D. Hanrahan, Woodinville, Wash.

[73] Assignee: U.S. Hydrex, Inc., Concord, Calif.

[21] Appl. No.: 08/606,588

[22] Filed: Feb. 26, 1996

[51] Int. Cl.[6] .............................. B01D 15/00; C02F 1/40
[52] U.S. Cl. .................... 210/693; 210/776; 210/800; 210/805; 210/807; 210/238; 210/242.3; 210/242.4; 210/265; 210/470; 210/923; 210/924; 210/925; 210/694
[58] Field of Search .................. 210/776, 242.3, 210/923, 470, 690, 691, 692, 693, 694, 800, 805, 807, 238, 242.4, 265, 532.1, 538, 924, 925

[56] References Cited

U.S. PATENT DOCUMENTS

| | | |
|---|---|---|
| 3,642,140 | 2/1972 | Parker ................................ 210/923 |
| 3,970,556 | 7/1976 | Gore . |
| 5,308,510 | 5/1994 | Gore . |
| 5,478,483 | 12/1995 | Gore . |
| 5,767,060 | 6/1998 | Hanrahan ........................... 210/502.1 |

*Primary Examiner*—Robert J. Popovics
*Attorney, Agent, or Firm*—Thomas M. Freiburger

[57] ABSTRACT

A portable liquid surface skimmer efficiently removes small spills of petroleum derivatives from the surface of water, and is useful, for example, on thin sheen spills of oil or gasoline, in boating marinas. The skimmer is controlled by a long handle held by an operator, with a swivel connection to the skimmer body. The skimmer body is placed in the water empty, to take on a controlled amount of water as ballast, putting the skimmer at a proper level to skim the surface using a floating weir. A withdrawal conduit from the skimmer's sump leads to a storage tank or more preferably to some form of separator on shore or on a dock, for further separation of water from the contaminants. In one preferred form of the system and method, the skimmed oil/water mix is passed through a special filter medium which removes the petroleum sufficiently that the water can be returned to its source, eliminating the need for hauling large volumes of liquid away to a disposal site.

3 Claims, 3 Drawing Sheets

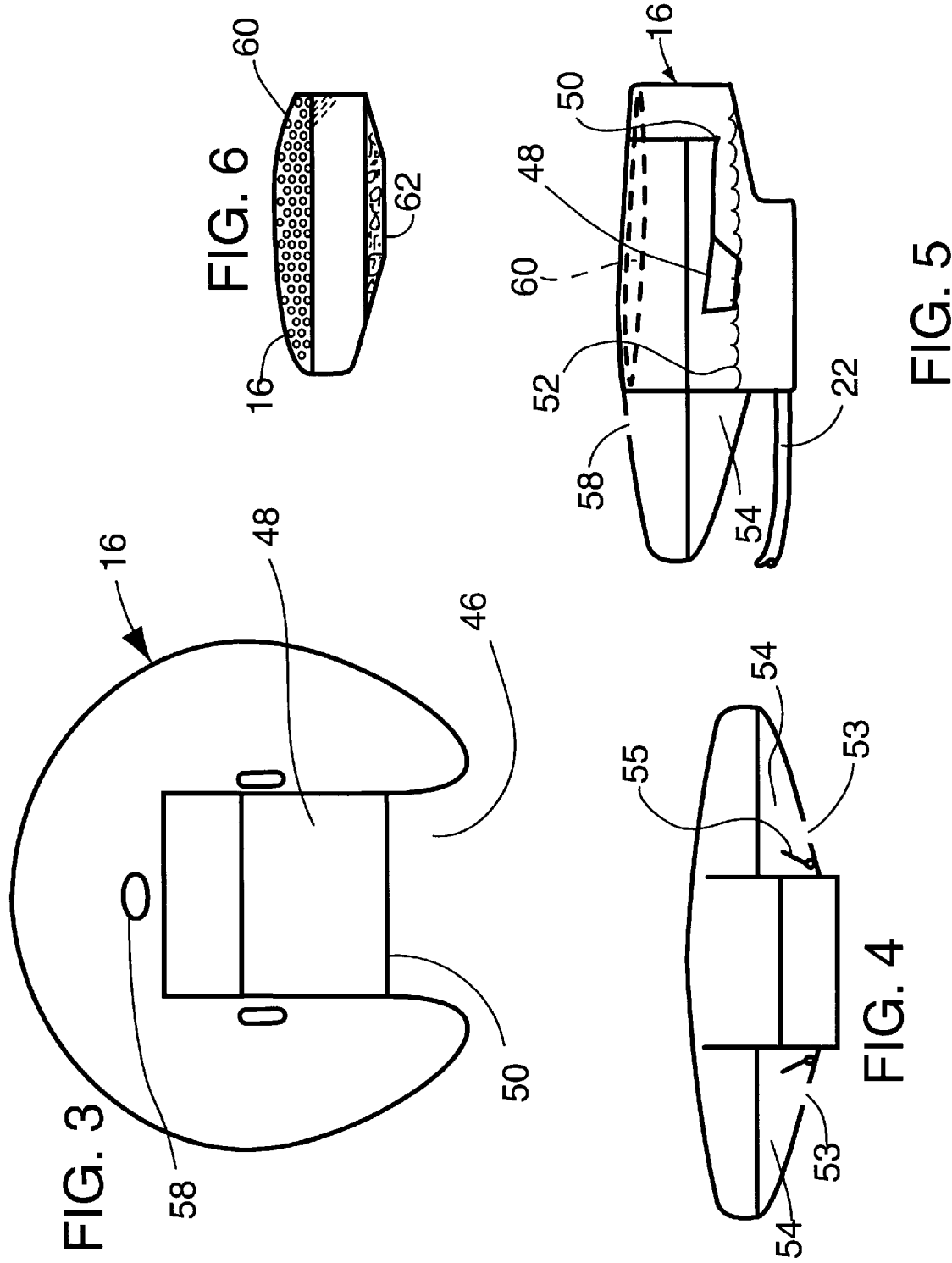

HAND MANIPULABLE SKIMMER SYSTEM FOR REMOVING AN OIL SHEEN FROM THE SURFACE OF A BODY OF WATER

BACKGROUND OF THE INVENTION

This invention concerns removal of a film or sheen of liquid which floats atop another liquid. In one specific embodiment the invention is concerned with skimming to remove a thin layer of a petroleum derivative from the surface of a body of water, particularly gasoline or oil sheen in a boating marina; the efficient removal of heavier layers of oil from bodies of water is also an objective of the invention.

Skimmers have been known in several forms. Floating skimmers may have fixed weirs or floating weirs, and as is well known, a relationship must be established between the surrounding body of liquid, the weir height and a sump behind the weir, in order to achieve a skim. Attention is directed to U.S. Pat. Nos. 3,970,556, 5,308,510 and 5,478,483.

In boating marinas and similar situations involving the dispensing or handling of oil, gasoline, diesel fuel or other lighter than water pollutants over or near a body of water, there has been a need for an efficient mechanism or procedure to remove the thin film or sheen of petroleum product which will float and quickly spread on the water when spilled. Over-filling of fuel tanks very often causes a pint or a quart of fuel to spill into the water, and this is objectionable in pristine lakes, rivers, bays and other bodies of water. In addition to the situation at marinas, many small spills occur into our environment because of vehicles which have hydrocarbon powered engines, and thus have fuel tanks which may rupture in the case of accidents. Often the spilled fuel runs to waterways and is difficult to clean up. This also occurs when hydrocarbons are carried around in barrels (drums) which are prone to damage in the case of accidents.

In such circumstances as well as other situations in which petroleum products are spilled in bodies of water, including in vessel bilges, there is a need for an efficient and cost-effective way to remove the petroleum products and separate them from water such that the water can be returned to its source or otherwise harmlessly to the environment without expensive transportation and further handling. Previous to this invention such spills of oil and other petroleum products have required large equipment and the accumulation and handling of a large and inefficient volume of liquid. Currently there has been no practical, economically feasible method of cleaning up these types of spill, because the concentrations of hydrocarbons on water are so slight that cleanup requires trucking away tons of water, and paying to have the water accepted as hazardous waste at an appropriate facility. Currently there has been no way of cleaning the water resulting from the skimming operation to allow the discharge of the water back into the environment.

There is also a need for an efficient skimmer apparatus and method for removing a floating layer of liquid from a body of another liquid, other than water, in certain industrial situations and liquid purification operations.

The present invention is directed toward providing a small, easily-used portable skimmer for removing a surface sheen or layer of liquid floating on water or on other heavier liquid, which skimmer may be used with a filter medium to thoroughly remove hydrocarbons from water, to the extent that the water may be returned to its source. The invention provides an easy to deploy method of removing the hydrocarbons from a relatively small spill, without the necessity of trucking away the water drawn in during skimming operations.

SUMMARY OF THE INVENTION

A small skimmer and associated apparatus in accordance with the invention is light in weight and easily stored, carried and deployed in the event of a minor spill such as at a boating marina. Used in a manner somewhat like a carpet sweeper or vacuum cleaner, the skimmer in one embodiment has an elongated handle piece or pole secured to a skimmer body in such a manner as to allow swiveling relative to the skimmer body and steering manipulation of the skimmer body by twisting of the pole. In another embodiment the skimmer may simply have a hose connected to the skimmer body, serving both as a skim withdrawal conduit and as a means of manipulation of the skimmer on the liquid body.

The skimmer body is hollow and light when not in use, with empty ballast tanks which are filled only when the skimmer is placed on the body of water. Permanent flotation means preferably are included, such as pieces of buoyant foam permanently located in the ballast tanks, occupying a small amount of the tank space; these buoyancy devices could take other forms (such as closed compartments) or be located elsewhere on the skimmer. Permanent, fixed ballast may also be included.

One form of swivel connection between the manipulating pole and the skimmer body is a two-axis gimbal, although other forms of connection can be used.

The ballast tank or tanks are configured in the skimmer body so as to evenly distribute the weight and buoyancy of the skimmer body, enabling swiveling of the skimmer without tipping. Although the skimmer body can be submergible to fill the ballast tanks, more preferably there are provided one or more openings in the bottom of the ballast tanks, with one or more air vents at the top side of the tanks, so that water will fill the ballast tanks when the implement is placed on the water surface. The water inlet openings may include flap valves as discussed further below, or in one embodiment they may simply comprise openings of restricted size to provide stability against surges of liquid in/out.

The skimmer includes a floating weir with a weir tip which will assume a height lower than the surrounding body of water. A sump behind the weir receives skimmed liquid, which will include the pollutant as well as some water. The sump liquid is withdrawn through a hose or tube, at a rate which establishes the flow rate of skim via the floating weir. As is known in the operation of skimmers, as skimming and sump withdrawal proceed, the skim is controlled by the pump rate. If the skim is to remove a sheen on water, because the sheen is so thin it is desirable to pump at a slow rate in relation to the length of the weir of the skimmer. As an example, if the weir width is six inches, a slow pump rate might be around four GPM; if the weir width is one foot, a slow rate of pumping might be about eight GPM. As sump withdrawal is increased, buoyancy of the skimmer is increased and the skimmer body tends to rise up in the water. The degree to which the skimmer body tends to rise in the water is first established by the amount of floatation under the weir, and is then slightly increased as the pump rate is increased.

The skimmer may be provided with a small float under the weir, and it will have little tendency to rise out of the water; this can allow fixed ballast to counterbalance the rise, and check valves would not be needed at the water inlets to the water-filled ballast tanks. Conversely, the attraction rate of the surface of the liquid can be enhanced by increasing the floatation under the weir, and in general this will require ballast tanks which will not drain (i.e., with a check valve at inlets) to keep the skimmer down in the water. Floatation also depends on the area of the sump in relation to the area of the ballast tanks and the weight of the structural material and any fixed ballast.

The outflow pumped from the skimmer sump can be handled in any of several ways: it can be processed by a separator on shore or on a boat from which the skimmer is operated; it can be put through a canister filter for separation of oil and water (which again can be located on shore or on a boat); or it can simply be pumped into a storage tank, without separation. Preferably, in the method and system of the invention, the collected liquid is subjected to a relatively thorough oil/water separation in a shoreside separation unit.

Water in a boat bilge is often contaminated with oil or fuel, and the small skimmer can be used to skim the oil fuel from the bilge water. Separation can be by either procedure described above.

The size and mass of the skimmer are important concerns toward portability and convenience of operation of the skimmer. This is why the skimmer has water ballast, which is dumped after use. It is preferred that the skimmer have an empty weight in the range of about two to 40 pounds, to allow ease in handling, preferably under 20 pounds; and an operating weight (ballast and sump) in the range of about 10 to 80 pounds. It is important to have this range of submerged mass to maintain stability in the skimmer.

It is therefore among the objects of the invention to provide a procedure and equipment for conveniently and efficiently removing a layer, which may be a thin sheen or film, of pollutant from the surface of a body of liquid on which the film floats, the implement being lightweight, easily portable and conveniently used. Another object is to remove petroleum pollutant from the collected water to the extent that the water may safely be returned to the environment. These and other objects, advantages and features of the invention will be apparent from the following description of a preferred embodiment, considered along with the accompanying drawings.

DESCRIPTION OF THE DRAWINGS

FIG. 3 is a plan view showing a skimmer body of the skimmer device.

FIG. 4 is a sectional elevation view of the skimmer body, as seen generally along the line 4—4 in FIG. 3.

FIG. 5 is a side elevational view in section showing the skimmer body and a floating weir of the skimmer.

FIG. 6 is a longitudinal cross section view of the skimmer body in elevation, showing fixed flotation and fixed ballast.

DESCRIPTION OF PREFERRED EMBODIMENTS

Figure 1:
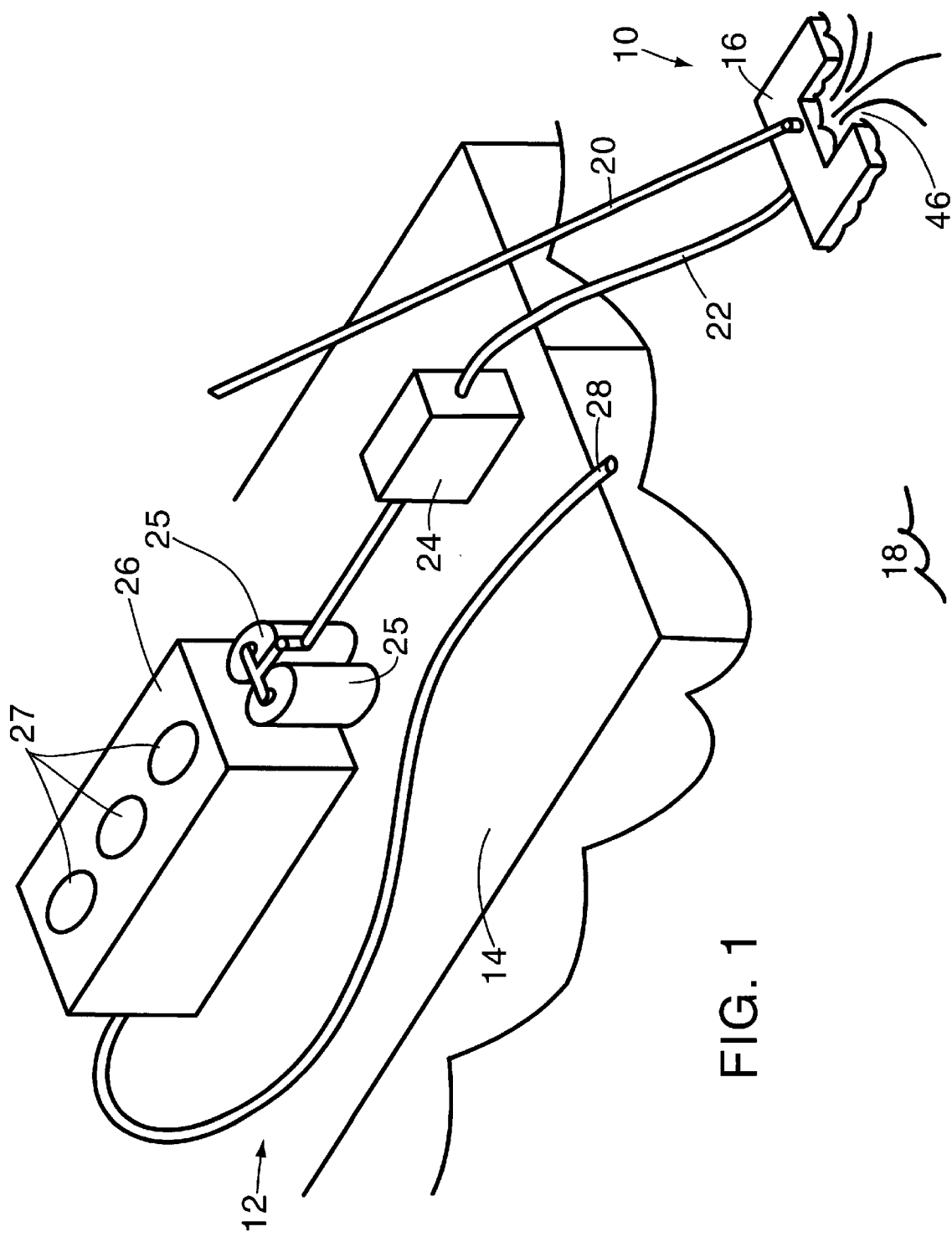
FIG. 1 is a somewhat schematic perspective view generally indicating the use of a liquid surface skimmer according to the invention, for removing a layer of liquid contaminant from a body of water or other liquid, with a filter medium receiving the collected liquid to remove contaminants.

In the drawings, FIG. 1 shows a portable skimmer device 10 as part of a larger, overall system 12. In FIG. 1 the skimmer 10 is indicated as in position to be used by an operator (not shown) from a dock 14 or shore position. The portable skimmer device 10 includes a skimmer body 16 floating on a body of water 18, and an elongated handle or pole 20 handled by the operator, for manipulating the position and direction of orientation of the skimmer.

As also shown in FIG. 1, the skimmer 10 has a hose or conduit 22 connected to the skimmer body for withdrawal of liquid from a liquid sump within the skimmer body. Withdrawal of liquid may be effected by a pump 24 on the shore or dock 14.

In another embodiment the withdrawal hose or conduit 22 may comprise the means by which the skimmer body is manipulated, without inclusion of elongated handle 20.

As explained above, the liquid withdrawn via the skimmer 10 may be handled in any of several ways, by pumping the entire volume of liquid into a tank, or by first separating the contaminant liquid as far as possible, then delivering only the separated contaminant into a tank or other holding area, or by filtering out the contaminant so thoroughly that the filtered water can be returned to the body 18. In FIG. 1 a system is shown in which the liquid is first passed through prefilters 25 to remove debris, then through a form of filter/separator 26, with effluent water discharged back into the body of water 18 by an outlet hose 28 and separated contaminant liquid being retained in a filter medium within the separator tank 26 by absorption and/or adsorption. The separator 26 can comprise a carbon filtration system, but more preferably it comprises a bonded polymer multi-component filter medium which concurrently absorbs and adsorbs organic compounds. The bonded filter medium is the subject of a copending application and will be explained further below. The use of such a thorough separation process and medium is important in one embodiment of the invention as reviewed above, wherein the equipment and process of the invention can be used to efficiently clean a relatively small spill without large equipment and without the need to truck large volumes of liquid away from the spill site. Access ports for the filter medium are shown at 27.

Figure 2:
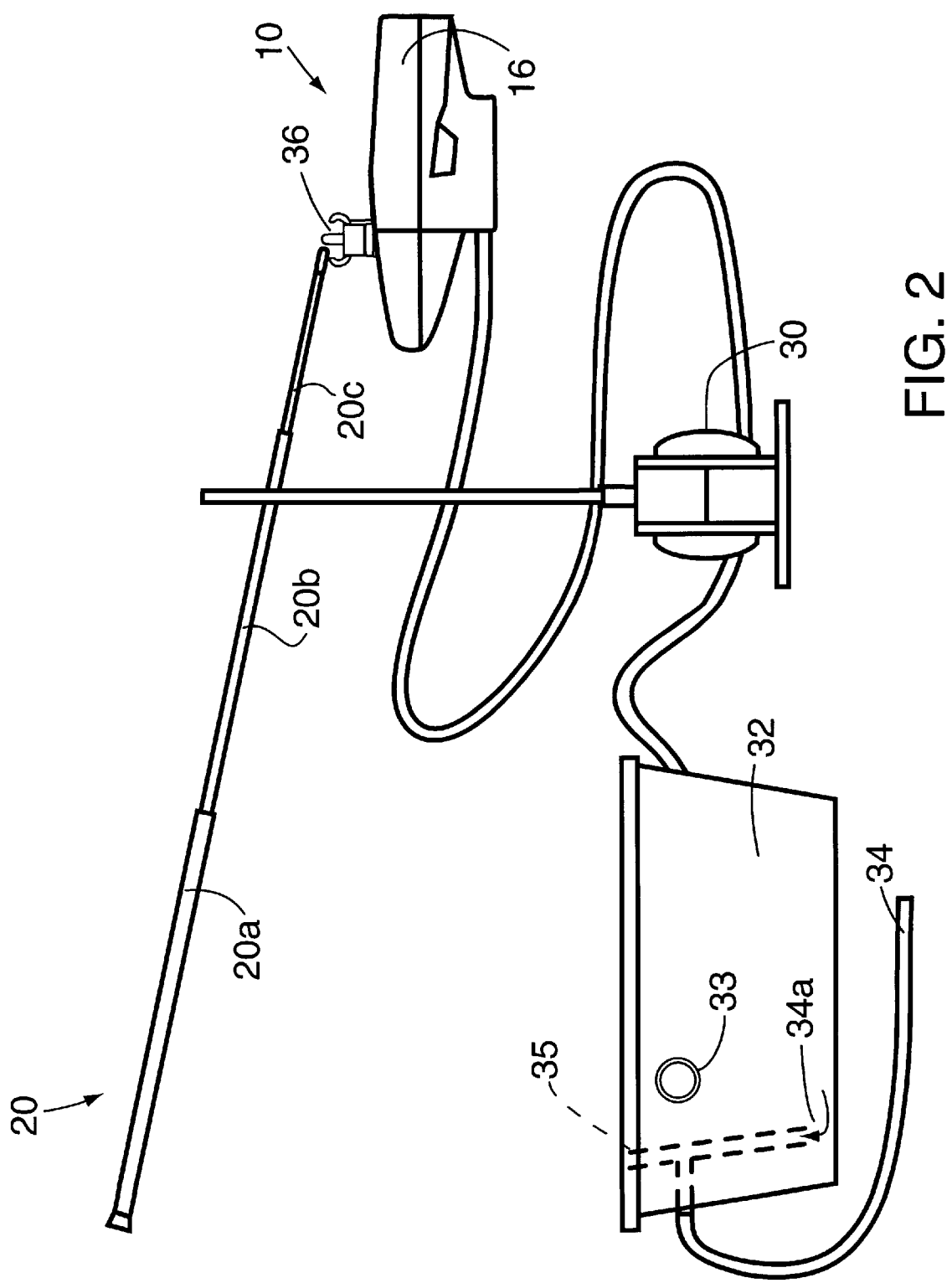
FIG. 2 is a schematic view to indicate use of the skimmer device without the filter medium.

FIG. 2 is a schematic drawing showing generally a modified system of the invention wherein the same skimmer device 10 is used in a manual operation, with a pump 30 which may be a manual pump withdrawing skimmer sump liquid and delivering it to a container/separator 32. The container/separator can be used to store a skimmed oil/water mix and it can be sealed when not in use. During use, the vessel 32 can be set up as a separator, removing the oil (or other petroleum product) from the water via an oil drain 33 and thus allowing a discharge at 34 of water which has entered a discharge inlet at 34a, vented at 35. The container/separator vessel 32 preferably includes interior baffles in order to minimize free surface. The discharged water has free oil removed but is still partially contaminated by fine oil dispersion within the water, which can be disposed of in some circumstances without hauling to a special disposal site. There are commercial and industrial situations where the partially contaminated oil can be reused or routed to a bio-reactor for clarification/reduction of contaminants.

As also shown in FIG. 2, the handle or pull 20 of the skimmer device 10 may be a multi-section telescoping pole (see sections 20a, 20b and 20c), to allow skimming up to about four meters away from the operator's position. FIG. 2 also illustrates a gimbal connection 36 where the pole 20 attaches to the skimmer body 16, allowing the swiveling function as described above.

As can be seen from the skimmer as represented in FIGS. 1 and 2, twisting of the upper end of the handle 20 will effect steering of the skimmer device as is desired for manipulating the direction of orientation of the skimmer on the water.

The skimmer device 10 is light in weight, as noted above, and most preferably is in the range of about two lbs. to 40 lbs. when empty and dry. It its structured to take on water when placed in the body of water 18, as ballast to set the skimmer body at a height on the water in an appropriate range such that an effective skim can be maintained. FIGS. 1 and 3 show that the portable skimmer body may be generally U-shaped, with a liquid entry recess 46 at the front, leading to a pivoted, floating weir 48. The floating weir 48 is pivoted at its front edge, i.e. at 50 as seen in the drawings.

FIGS. 3–5 show the skimmer body 16 in plan, front elevation and side sectional elevation views, revealing the pivoted, floating weir 48. Behind the weir 48 is a liquid sump 52 into which skimmed liquid flows and on which the pivoted weir 48 floats. The liquid sump 52 and the floating weir 48 are better seen in the sectional elevation view of FIG. 5, which is a view from the right side of the skimmer. FIG. 5 also shows the withdrawal hose or conduit 22 leading back from the bottom of the sump 52.

As explained above, the skimmer body 16 includes provision for taking on water from the body of water 18 as ballast. For this purpose, one or more openings 53 allow water to enter the ballast tank 54 in the skimmer body. Flap valves 55, comprising check valves, optimally may be included if needed for reasons explained above. When the empty skimmer body is placed in the water, water flows into the ballast tank 54, which preferably is in the form of a U-shape within the skimmer body, until the ballast tank or tanks are substantially filled. Air is displaced through an air vent 58 shown in FIGS. 3 and 5 at the top of the skimmer body. The flap valves 55, if included, will assume the closed position at any time the water in the ballast tanks tends to flow outwardly, that is, when the level of the sump 52 is pulled down and the skimmer body tends to float up under some parameters and circumstances of operation, which would otherwise start to release water from the bottom of the ballast tanks.

The filling of the ballast tank or tanks establishes a mass of the skimmer body in the water, so that stability is provided and so that during a skim, as sump liquid is withdrawn through the conduit 22, tending to evacuate the sump, the skimmer body does not float up to the extent that the skim is halted. To prevent total submergence of the skimmer body when it is placed in the water, permanent flotation devices 60 such as foam are located inside the ballast tanks or elsewhere on the skimmer body.

FIG. 6 shows, in longitudinal cross section elevation view, a preferred position of the permanent floatation material 60, preferably a foam material, and the location of the permanent ballast 62, which can be, e.g., a sand/resin mix. Of course, the mass of the skimmer body 16 itself serves in part as permanent ballast, and the additional permanent ballast 62 may or may not be needed, depending on the design and materials of the skimmer body.

Those skilled in the art will appreciate that the skimmer, pump and separation units must be coordinated as to sizes and capacities in order to work properly. The skimmer and pump must be matched so that sufficient fluid is pulled over the weir to establish an efficient skim, and so that the pump does not exceed the capability of the weir to supply fluid based upon its physical length and depth. Secondly, the size of the separation chamber, when such a chamber is employed as in FIG. 2, must be large enough to provide the proper dwell time for the separation method being used. For gravity separation, the chamber should be large enough to allow a 20 minute retention time. Thus if the skimmer and the pump are operating at 20 GPM, the separation chamber should have a minimum capacity of 400 gallons. If the separation is accomplished by means of an oil absorbing (and adsorbing) medium (as in FIG. 1), the separation chamber (holding the medium) must be sized so as to allow at least a 5 minute retention time, so consequently, if the pump and skimmer operate at 20 GPM, the separation chamber must have a minimum capacity of 100 gallons (for ease of calculation the stated retention time is escalated to compensate for the space occupied by the medium). The use of the oil absorbing medium thus provides a great advantage.

As noted above, the filter medium employed in the system and method of FIG. 1, in the filter tank 26, preferably is a bonded polymer multi-component medium for the concurrent adsorption and absorption of organic compounds. Such a medium is far superior to activated carbon in the removal of organics such hydrocarbon derivatives from water. With active carbon, the ratio of available surface adsorption sites to total volume of carbon is relatively low when treating waste water streams. However, with the bonded filter medium to be used with the invention (and the subject of a separate, copending patent application), efficiencies of 250 percent to 400 percent, weight-by-weight comparison, can be achieved. In particular, with petroleum products, referred to as BTEX (benzene, ethylbenzene, toluene and xylene), carbon is about 10 percent efficient by weight, whereas the bonded filter medium exceeds 400 percent efficiency by weight. Moreover, carbon alone will not work on emulsified oils, it is therefore not useful alone for oil spill cleanups. The bonded filter medium, on the other hand, is effective to remove nearly all the emulsified petroleum products. The medium breaks down the emulsion and breaks down the hydrocarbon itself.

The medium used with the invention preferably contains at least two active components, namely activated carbon adsorbent and an organic polymer absorbent blend. The blend is bonded with an appropriate binder adhesive such as an aliphatic resin binder adhesive. Although a variety of hydrophobic polymers are available for absorbing petroleum based products, varying somewhat in polymer type, molecular weight, cross linkages, density, etc., in the preferred embodiment, petroleum binding agent polymers well suited for use with the invention are three-block copolymers with polystyrene end blocks and elastomer midblocks. The first polymer is a linear styrene-butadiene-styrene (S-B-S) copolymer with a 70/30 butadiene/styrene ratio. The second is a styrene-ethylene/butalene-styrene (S-EB-S) copolymer. The specific gravity of these copolymers averages about 0.91.

The filter medium is prepared by adding a selected quantity of carbon of a preselected size to a mixer, then wetting the activated carbon with a water-based aliphatic resin binder adhesive, thus eliminating the static charge on the carbon; and then adding the hydrophobic absorption bonding polymers to the mixer. The polymers are then thoroughly mixed with the carbon in the stated proportions, until both the carbon particles and the polymer particles are effectively coated with the binder adhesive. After thorough mixing, the medium mixture is preferably poured into filter cartridge forms, then air dried at room temperature and low humidity to cure the aliphatic resin adhesive binder. This forms a loose but cohesive and relatively low density sponge-like mass. The medium is porous, in that the cured resin bonds carbon and polymer alike in a semi-rigid but flexible position, relative to adjacent particles of carbon and copolymer. It appears that the cured resin is somewhat crystalline in nature and thus forms hydraulic passageways through which the fluid to be treated must flow, thereby keeping up the hydraulic radiant for flow into the carbon and thus increasing its effective contaminant removal efficiency.

The cured resin binder is not water soluble, so that it is unaffected by passage of water therethrough.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. A method for removing a sheen of petroleum derivative from the surface of a body of water, comprising:

using a portable skimmer apparatus having a skimmer manipulating means, positioning the skimmer on the body of water where the layer of petroleum derivative is to be removed, allowing one or more ballast tanks of the skimmer to fill with water from the body of water to add ballast and stability to the skimmer, manipulating the skimmer apparatus by moving the apparatus around on the body of water to areas where the petroleum derivative lies, to skim a surface layer, including the sheen of petroleum derivative, into a liquid sump onboard the skimmer, drawing off liquid from the sump using a pump, as the skim progresses, delivering the liquid from the sump to a separation area and causing the liquid delivered to the separation area to flow through a filter means having a bonded polymer multi-component filter medium with means for absorbing and adsorbing organic compounds passed through the medium in a mix with water, and thereby thoroughly separating the petroleum derivative from the water to the extent that the water can be returned harmlessly to the environment, and returning the water, separated from the petroleum derivative, to the body of water.

2. A method for removing a layer of petroleum derivative from the surface of a body of water, comprising:

using a skimmer apparatus having a pivoted, floating weir with a liquid sump downstream of the weir in which the weir floats, and the skimmer apparatus having a skimmer manipulating means, positioning the skimmer on the body of water where the layer of petroleum derivative is to be removed, allowing one or more ballast tanks of the skimmer to fill with water from the body of water to add ballast and stability to the skimmer, manipulating the skimmer apparatus using the skimmer manipulating means by moving the apparatus around on the body of water to areas where the petroleum derivative lies, to skim a surface layer, including the layer of petroleum derivative, into a liquid sump onboard the skimmer, drawing off liquid from the sump using a pump, as the skim progresses, and delivering the liquid from the sump to a storage or separation area, then causing the liquid from the sump to flow through a filter means having a bonded polymer multi-component filter medium with means for absorbing and adsorbing organic compounds passed through the medium in a mix with water, the filter medium including activated carbon particles, at least one hydrophobic polymer binding agent adapted to coagulate and bind organic substances from the water stream, and bonding means for coating at least some of the polymer particles and, upon curing of the bonding means, for affixing in a semi-solid sponge-like mass the polymer and carbon particles.

3. A method for removing a layer of petroleum derivative from the surface of a body of water, comprising:

using a skimmer apparatus having a skimmer manipulating means, positioning the skimmer on the body of water where the layer of petroleum derivative is to be removed, allowing one or more ballast tanks of the skimmer to fill with water from the body of water to add ballast and stability to the skimmer, manipulating the skimmer apparatus by moving the apparatus around on the body of water to areas where the petroleum derivative lies, to skim a surface layer, including the layer of petroleum derivative, into a liquid sump onboard the skimmer, drawing off liquid from the sump using a pump, as the skim progresses, and delivering the liquid from the sump to a separation area and causing the liquid delivered to the separation area to flow through a filter means having a bonded polymer multi-component filter medium with means for absorbing and adsorbing organic compounds passed through the medium in a mix with water, the filter medium including activated carbon particles, at least one hydrophobic polymer binding agent adapted to coagulate and bind organic substances from the water stream, and bonding means for coating at least some of the polymer particles and, upon curing of the bonding means, for affixing in a semi-solid sponge-like mass the polymer and carbon particles.

* * * * *